Nov. 17, 1953  A. V. WATERS  2,659,855
SIGNAL AND CUTOUT FOR USE IN DYNAMO-BATTERY SYSTEMS
Filed Feb. 27, 1951
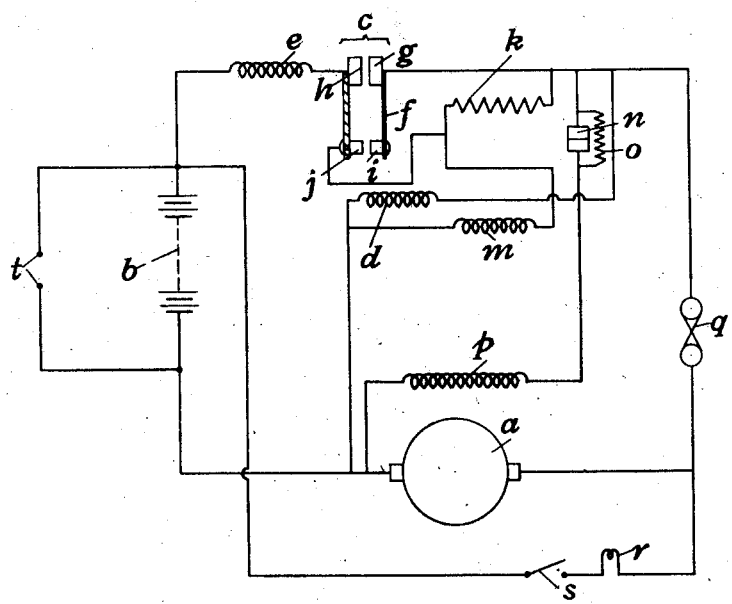
Inventor
A. V. Waters
By Stewart Downing Diebold
Attys.

Patented Nov. 17, 1953

2,659,855

UNITED STATES PATENT OFFICE 2,659,855

SIGNAL AND CUTOUT FOR USE IN DYNAMO-BATTERY SYSTEMS

Albert Victor Waters, Perivale, Greenford, England, assignor to C. A. V. Limited, London, England Application February 27, 1951, Serial No. 212,895

Claims priority, application Great Britain March 7, 1950

1 Claim. (Cl. 320—29)

This invention relates to a dynamo-battery system (as used on, for example, a road vehicle) of the kind which includes an electro-magnetic cut-out between the dynamo and battery, a dynamo regulator which is responsive to at least the dynamo voltage, and a warning lamp or other signal.

The object of the present invention is to provide an improved cut-out which in addition to its normal function ensures the bringing into action of the warning lamp or other signal to indicate under any condition (including the blowing of a fuse between the dynamo and battery) when current is not being supplied to the battery by the dynamo.

The invention comprises a cut-out adapted to control both the dynamo-battery circuit and a circuit which includes means for modifying the normal action of the regulator.

The accompanying drawing illustrates diagrammatically a dynamo-battery system which includes a cut-out embodying the invention.

Referring to the diagram, the dynamo is indicated by $a$, the battery by $b$, and the cut-out by $c$. The cut-out includes an electromagnet which is provided with a winding $d$ for closing the cut-out in response to a predetermined dynamo voltage. It is also provided with a winding $e$ adapted to be connected in series with one side of the cut-out and the battery. The cut-out includes a movable armature $f$ carrying or adapted to actuate a contact $g$ which cooperates with a complementary fixed contact $h$ for controlling the connection between the dynamo and battery. Also the said armature carries or is adapted to actuate an additional contact $i$ which by co-operation with a complementary fixed contact $j$ can short circuit a resistance $k$ arranged in series with the voltage winding $m$ of an electromagnet forming a part of the dynamo regulator. The latter is of known kind and includes a pair of contacts $n$ which when separated by the electromagnet carrying the said winding $m$ inserts a resistance $o$ in series with the field winding $p$ of the dynamo. Further the cut-out $c$ is designed so that a relatively small reverse current through the winding $e$ between the battery and dynamo will ensure opening of the cut-out. This condition is met by adjusting the operating voltage of the cut-out to a higher value than that which normally actuates the regulator, so that when the cut-out is closed the current through its voltage winding $d$ falls, and the cut-out is held closed mainly by the action of the current in the series winding $e$. The resistance $k$ in series with the voltage winding $m$ of the regulator is operative when the cut-out is open and so prevents the regulator operating under a normal voltage while the cut-out is open.

The system for which the cut-out is required also includes a fuse $q$ between the dynamo and cut-out, and a warning lamp $r$ or other signal in a circuit connected across the dynamo and battery. This circuit is controlled by a manually operable switch $s$ which may be associated with an engine-ignition switch. The load circuit is connected across the battery at terminals $t$.

When the dynamo is set in motion (the cut-out being open) the signal $r$ (after closing of the switch $s$) is actuated in the usual way, and becomes inoperative when the cut-out closes on the attainment of the requisite dynamo voltage. But should the fuse $q$ blow while the dynamo is working and so isolate the dynamo from the battery, the signal will again become operative. Consequently the signal comes into action at all times when the dynamo is not charging the battery, and the adaption of the cut-out to operate with a relatively small reverse current ensures that the cut-out will open immediately the fuse is blown.

Having thus described my invention what I claim as new and desire to secure by Letters Patent is:

A dynamo-battery system for use for example on a road vehicle, comprising in combination a dynamo regulator including an electromagnet responsive to dynamo voltage, a resistance in series with said electromagnet, an electromagnetic cut-out having a voltage winding responsive to dynamo voltage and adapted to operate at a higher voltage than that which normally operates the regulator, a current winding for said cut-out connected between the cut-out and the battery so that a relatively small reverse current through said winding will ensure opening of the cut-out, the cut-out having an armature and two sets of contacts, the movable contact of each set being carried by said armature, a first set of said contacts being connected between the dynamo and the battery in series with said current winding, and the other set of said contacts being connected across said resistance to short-circuit the resistance when the cut-out contacts are closed, a fuse between one side of the dynamo and the said first set of cut-out contacts, and a signal device in a circuit connecting said one side of the dynamo with the corresponding pole of the battery, the arrangement being such that the signal device is brought into action under any condition, including the blowing of the fuse, when current is not being supplied to the battery by the dynamo.

ALBERT VICTOR WATERS.

References Cited in the file of this patent

UNITED STATES PATENTS

| Number | Name | Date |
|---|---|---|
| 1,180,776 | Laycock | Apr. 25, 1916 |
| 1,219,008 | Kennington | Mar. 13, 1917 |
| 1,928,189 | Swint | Sept. 26, 1933 |
| 2,033,013 | Thompson | Mar. 3, 1936 |
| 2,152,576 | Weeks | Mar. 28, 1939 |
| 2,218,109 | Hochstetter | Oct. 15, 1940 |
| 2,225,158 | Crawford | Dec. 17, 1940 |
| 2,469,092 | Webb | May 3, 1949 |

FOREIGN PATENTS

| Number | Country | Date |
|---|---|---|
| 300,953 | Germany | Oct. 1, 1917 |
| 556,170 | France | Apr. 9, 1923 |
| 603,521 | Great Britain | June 17, 1948 |